US012231346B2

(12) United States Patent
Kurakin et al.

(10) Patent No.: US 12,231,346 B2
(45) Date of Patent: Feb. 18, 2025

(54) OUT OF ORDER PACKET SCHEDULER (71) Applicant: MAXLINEAR, INC., Carlsbad, CA (US)

(72) Inventors: Artem Kurakin, Hornsby (AU); Richard Kinder, Eastwood (AU); Ilya Ostanin, Saint-Petersburg (RU)

(73) Assignee: MAXLINEAR, INC., Carlsbad, CA (US)

( * ) Notice: Subject to any disclaimer, the term of this patent is extended or adjusted under 35 U.S.C. 154(b) by 0 days.

(21) Appl. No.: 18/358,910

(22) Filed: Jul. 25, 2023

(65) Prior Publication Data

US 2023/0370389 A1 Nov. 16, 2023

Related U.S. Application Data (63) Continuation of application No. 17/697,555, filed on Mar. 17, 2022, now Pat. No. 11,711,312, which is a continuation of application No. 17/060,754, filed on Oct. 1, 2020, now Pat. No. 11,290,387.

(30) Foreign Application Priority Data

Mar. 30, 2020 (RU) .......................... RU2020112721

(51) Int. Cl.
*H04L 47/50* (2022.01)
*H04L 43/0888* (2022.01)
*H04L 43/106* (2022.01)
*H04W 72/542* (2023.01)

(52) U.S. Cl.
CPC .......... *H04L 47/50* (2013.01); *H04L 43/0888* (2013.01); *H04L 43/106* (2013.01); *H04W 72/542* (2023.01)

(58) Field of Classification Search
None
See application file for complete search history.

(56) References Cited

U.S. PATENT DOCUMENTS

| | | | | |
|---|---|---|---|---|
| 5,996,064 | A * | 11/1999 | Zaidi ..................... | G06F 9/3856 712/216 |
| 11,711,312 | B2 * | 7/2023 | Kurakin ................ | H04L 43/106 370/329 |
| 2001/0030967 | A1 * | 10/2001 | Kyusojin ................ | H04L 47/10 370/429 |
| 2008/0095181 | A1 | 4/2008 | Suetsugu et al. | |
| 2013/0336250 | A1 | 12/2013 | Park et al. | |
| 2014/0160929 | A1 | 6/2014 | Wu et al. | |

(Continued)

*Primary Examiner* — Anh Ngoc M Nguyen
(74) *Attorney, Agent, or Firm* — Buchalter; Jason W. Croft (57) ABSTRACT An example method may include identifying a first transmit identifier (TID) associated with a first node of a wireless network as ready to transmit and adding the first TID to a ready to transmit queue at a first point in time. The method may also include identifying a second TID associated with a second node of the wireless network as ready to transmit, and adding the second TID to the ready to transmit queue at a second point in time later than the first point in time. The method may additionally include selecting the second TID from the ready to transmit queue before selecting the first TID based on a projected increased overall throughput of packets within the wireless network when communicating with the second node before communicating with the first node.

18 Claims, 8 Drawing Sheets (56) References Cited

U.S. PATENT DOCUMENTS

| | | |
|---|---|---|
| 2014/0269634 A1 | 9/2014 | Shapira et al. |
| 2017/0118769 A1 | 4/2017 | Abinader et al. |
| 2020/0068585 A1 | 2/2020 | Yoshikawa |
| 2021/0099554 A1* | 4/2021 | Liu .................. H04L 69/28 |

* cited by examiner

OUT OF ORDER PACKET SCHEDULER

CROSS-REFERENCE TO RELATED APPLICATION

This patent application is a continuation of U.S. patent application Ser. No. 17/697,555 filed Mar. 17, 2022, which is a continuation of U.S. application Ser. No. 17/060,754 filed Oct. 1, 2020, which claims priority to Russian Patent Application No. 2020112721 filed Mar. 30, 2020, each of which is incorporated herein by reference in their entireties.

FIELD

The implementations discussed herein are related to an out of order packet scheduler.

BACKGROUND

Unless otherwise indicated herein, the materials described herein are not prior art to the claims in the present application and are not admitted to be prior art by inclusion in this section.

Home, office, stadium, and outdoor networks, a.k.a. wireless local area networks (WLAN) are established using a device called a Wireless Access Point (WAP). The WAP may include a router. The WAP wirelessly couples all the devices of the local network, e.g. wireless stations such as: computers, printers, televisions, digital video (DVD) players, security cameras and smoke detectors to one another and to the Cable or Subscriber Line through which Internet, video, and television is delivered to the local network. Most WAPs implement the IEEE 802.11 standard which is a contention-based standard for handling communications among multiple competing devices for a shared wireless communication medium on a selected one of a plurality of communication channels. The frequency range of each communication channel is specified in the corresponding one of the IEEE 802.11 protocols being implemented, e.g. "a", "b", "g", "n", "ac", "ad", "ax". Communications follow a hub and spoke model with a WAP at the hub and the spokes corresponding to the wireless links to each 'client' device or station (STA) utilizing the WLAN.

However, when selecting packets for transmission from the WAP, some selection approaches lead to wasted use of the wireless medium and a corresponding inefficiency.

The subject matter claimed herein is not limited to implementations that solve any disadvantages or that operate only in environments such as those described above. Rather, this background is only provided to illustrate one example technology area where some implementations described herein may be practiced.

SUMMARY

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Some example implementations described herein generally relate to an out of order scheduler for packet transmission. Some implementations provide a method, system, and/or apparatus to facilitate the scheduling of such packets for transmission.

An example method may include identifying a first transmit identifier (TID) associated with a first node of a wireless network as ready to transmit, and adding the first TID to a ready to transmit queue at a first point in time. The method may also include identifying a second TID associated with a second node of the wireless network as ready to transmit, and adding the second TID to the ready to transmit queue at a second point in time later than the first point in time. The method may additionally include selecting the second TID from the ready to transmit queue before selecting the first TID based on a projected increased overall throughput of packets within the wireless network when communicating with the second node before communicating with the first node.

The present disclosure may be implemented in hardware, firmware, or software.

Associated devices and circuits are also claimed.

Additional features and advantages of the present disclosure will be set forth in the description which follows, and in part will be obvious from the present disclosure, or may be learned by the practice of the present disclosure. The features and advantages of the present disclosure may be realized and obtained by means of the instruments and combinations particularly pointed out in the appended claims. These and other features of the present disclosure will become more fully apparent from the following description and appended claims or may be learned by the practice of the present disclosure as set forth hereinafter.

BRIEF DESCRIPTION OF THE DRAWINGS

To further clarify the above and other advantages and features of the present disclosure, a more particular description of the present disclosure will be rendered by reference to specific implementations thereof which are illustrated in the appended drawings. It is appreciated that these drawings depict only typical implementations of the present disclosure and are therefore not to be considered limiting of its scope. The present disclosure will be described and explained with additional specificity and detail using the accompanying drawings in which.

DETAILED DESCRIPTION OF SOME EXAMPLE IMPLEMENTATIONS

Implementations described herein may generally include an approach to perform out of order scheduling of TIDs for transmission. For example, rather than a typical round robin scheduling of TIDs, a scheduler may be configured to select a given TID for transmission even before other TIDs that indicated they were ready to transmit before the given TID. In some embodiments, when a given TID is identified as ready to transmit, the given TID may be placed within a ready to transmit queue based on metrics identifying the associated transmission of the given TID's effect on the overall throughput in a wireless network (e.g., an effective data bitrate). If the metrics of the given TID indicate it will help the overall throughput to be more efficient, the given TID may be placed closer to the head of the ready to transmit queue, and if the metrics of the given TID indicate it will lower the overall throughput of the wireless network, the given TID may be placed further away from the head of the ready to transmit queue. As another example of out of order scheduling of TIDs, when selecting a TID from the ready to transmit queue for transmission, rather than selecting the TID at the head of the queue, a scheduler may look deeper into the queue to consider the metrics of other TIDs in addition to the TID at the head of the queue. In these and other embodiments, the scheduler may select the TID with metrics indicating the most efficient throughput for the wireless network.

By using such out of order scheduling of TIDs, consistent with some embodiments of the present disclosure, network throughput may be improved. Such improvements may reduce overall network traffic, may decrease backlog and transmission delays, and may improve network speeds observed by consumers using wireless networks. Additionally, the improvements of the present disclosure may facilitate improved network functionality in crowded networks in which multiple devices are waiting to receive data within a wireless network.

Reference will now be made to the drawings to describe various aspects of example implementations of the present disclosure. It is to be understood that the drawings are diagrammatic and schematic representations of such example implementations, and are not limiting of the present disclosure, nor are they necessarily drawn to scale.

Figure 1:
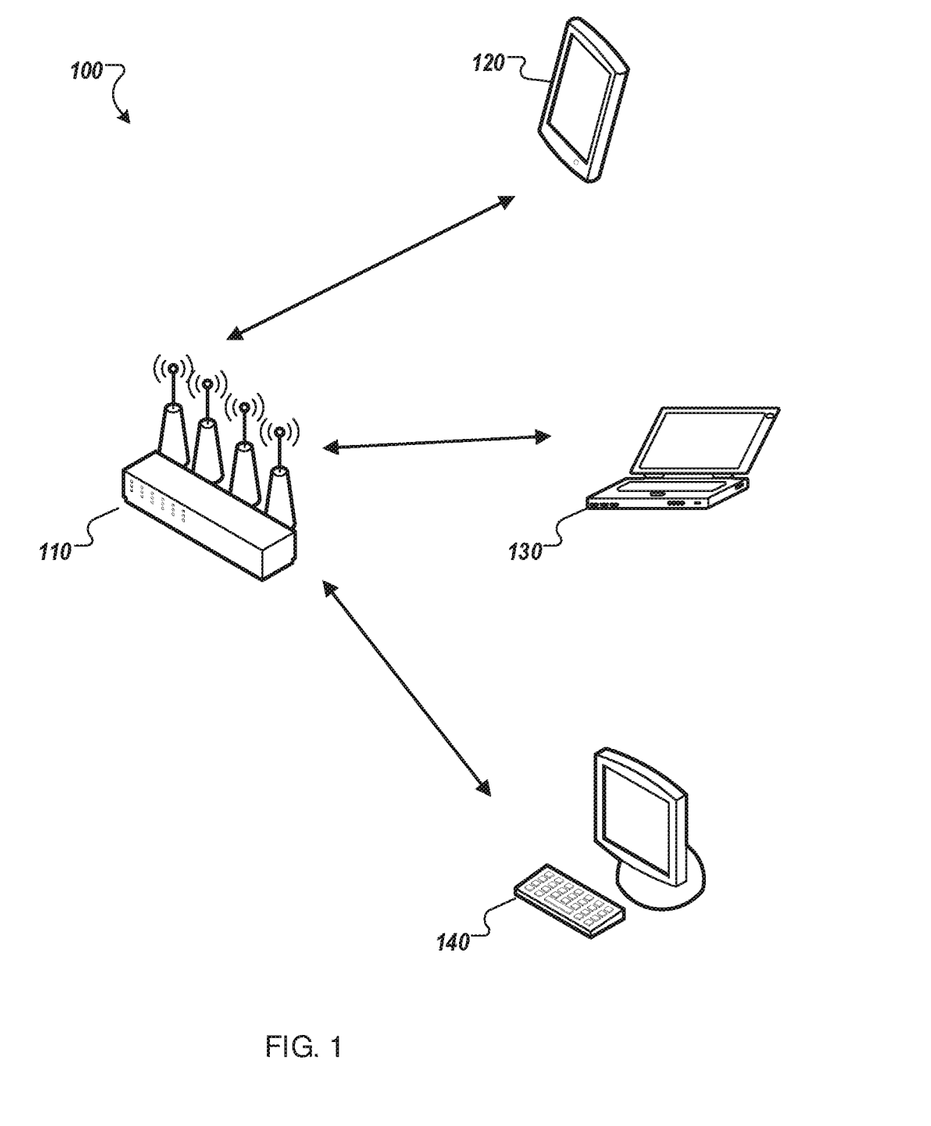
FIG. 1 illustrates an example environment within which an out of order packet scheduler may be implemented.

FIG. 1 illustrates an example environment 100 within which out of order scheduling of TIDs may be implemented, in accordance with one or more embodiments of the present disclosure. The environment 100 illustrates an access point (AP) 110 and three nodes 120, 130 and 140, where the AP 110 and the nodes 120, 130, and 140 may all wirelessly communicate with each other.

In operation, the AP 110 may be communicating various packets to each of the nodes 120, 130, and 140, individually. For example, the node 120 may be watching videos while browsing the Internet, the node 130 may be participating in a VOIP call, and the node 140 may be updating software. As another example, the node 120 may be a refrigerator, the node 130 may be a washing machine, and the node 140 may be a thermostat, all in wireless communication with the Internet. For each of the nodes 120, 130, and 140, they may be waiting for the AP 110 to transmit the next batch of packets. However, as the AP 110 is servicing multiple nodes with multiple types of packets, there may be some decision process that occurs at the AP 110 to decide which node is next to receive packets.

In some embodiments, the selection for transmission is based on transmission identifiers (TIDs). A TID for a given node may represent a certain class of packets for that node. For example, a TID may be associated with a class of packets with a certain priority for transmission. For example, one TID may be a class related to background packets, another TID may be a class related to best efforts (e.g., deserving of a high priority), another TID may be a class related to video packets, and another TID may be a class related to voice packets. While four examples are given, there may be any number of TIDs, such as eight, sixteen, etc. For convenience, a given TID may be referred to by a numerical identifier for convenience in articulating various TIDs (e.g., TID 1, TID 2, etc.).

To improve the performance of the environment 100, various metrics may be observed within the environment 100 to facilitate the efficient transmission of packets within the environment 100. In some embodiments, the metrics may be based on a physical layer (PHY) rate for a given node, a number of transmission bytes that have been aggregated for transmission to the given node, and a protocol overhead used when transmitting to the given node. These factors together may indicate a certain number of packets that may be provided for a particular slot of available transmission medium or an effective data bitrate. For nodes with lower PHY rates, or that have not accumulated as many packets, the overall throughput will be lower than for nodes with higher PHY rates, or that have accumulated more packets. The protocol overhead is often a fixed amount for each slot of transmission (thus causing a decrease in overall throughput if the same overhead is repeated for fewer packets at a lower PHY rate as opposed to the same overhead for more packets at a higher PHY rate). Such a combination may yield an effective data bitrate. In some embodiments, the PHY rate may change at different points in time such that the one or metrics for a given TID may be different at different points in time at least because of variations in the PHY rate. In some embodiments, any other metrics may be used or considered. As the complexity of the metrics increases, a more detailed and/or clear view into actual differences in network performance may be observed but at a cost of increased processing and computation power and time delay to determine the metrics. A balance may be struck between a complete and accurate picture of the effect on network throughput and the processing power and delay to achieve that complete and accurate picture. The metrics may be determined or each transmission request on a per TID basis (e.g., the metrics may be determined for TID 1 associated with Node 1, etc.). In these and other embodiments, the metrics may represent a projection, forecast, estimation, extrapolation, prediction, etc. of the overall throughput within the wireless network.

As packets of a first TID (such as the TID of background packets) for a first node are ready for transmission, the first TID for the first node may be added to a ready to transmit queue. For example, with reference to FIG. 1, packets in the first TID may be ready to transmit to the node 120, and packets in the first TID may be ready to transmit to the node 140. The first TID for each of the nodes 120 and 140 may be added to the ready to transmit queue associated with the first TID. In these and other embodiments, each set of TIDs may be associated with its own ready to transmit queue. For example, the set of first TIDs (e.g., best efforts) associated with each of the nodes 120, 130, and 140 may be associated with a first ready to transmit queue and the set of second TIDs (e.g., video) associated with each of the nodes 120, 130, and 140 may be associated with a second ready to transmit queue. In selecting TIDs for transmission, the TIDs may be selected in an order that may be based on efficiency rather than based on an order in which they were ready to transmit or completely equally. Various examples of such out or order scheduling may be described in greater detail with reference to FIGS. 2-7.

Figure 8:
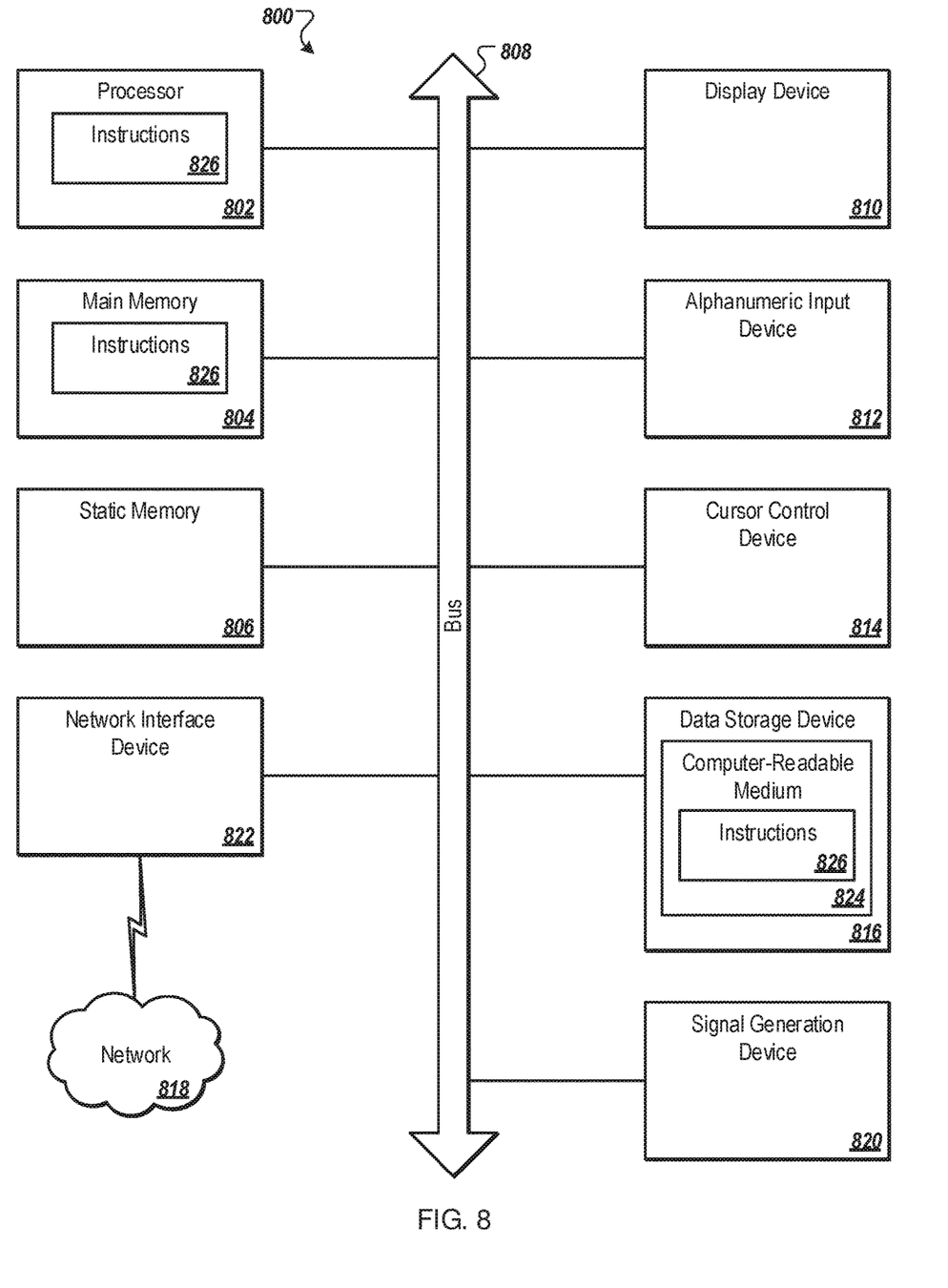
FIG. 8 illustrates a diagrammatic representation of a machine in the example form of a computing device, all according to at least one implementation described in the present disclosure.

The AP 110 may include a gateway, a repeater, a mesh node, and/or other suitable access point for wireless stations or devices such as the nodes 120, 130, and 140. The AP 110 may connect to the Internet and/or a core network via a bridge, a backhaul link, a base station, and/or other suitable devices or connections. One example implementation of the AP 110 as a computing device is illustrated in FIG. 8.

Each of the nodes 120, 130, and 140 may generally include any device that has the capability to wirelessly connect to the AP 110 according to any of the 802.11 standards or other suitable wireless standard. Each of the nodes 120, 130, and 140 may include a desktop computer, a laptop computer, a tablet computer, a mobile phone, a smartphone, a personal digital assistant (PDA), a smart television, any other smart appliance, or any other suitable wireless station. For example, if the node 120 is a refrigerator with one PHY rate, and the node 130 is a thermostat with a higher PHY rate, the node 130 corresponding to the thermostat may be selected for transmission out or order ahead of the node 120 corresponding to the refrigerator based on the higher throughput. One example implementation of the nodes 120, 130, and 140 as a computing device is illustrated in FIG. 8.

Modifications, additions, or omissions may be made to the environment 100 without departing from the scope of the present disclosure. For example, the designations of different elements in the manner described is meant to help explain concepts described herein and is not limiting. Further, the environment 100 may include any number of other elements or may be implemented within other systems or contexts than those described. For example, any number of APs 110 and/or nodes 120, 130, and/or 140 may be included.

In an example implementation, a method to manage a transmit queue can include: in response to receiving a transmission request to add to a queue, determining a first set of one or more metrics associated with an estimated effect of the transmission request on the overall throughput in a wireless network. The method may also include, prior to adding the transmission request to the queue, comparing the first set of the one or more metrics associated with the transmission associated with the transmission request's estimated effect and a second set of one or more metrics associated with an estimated effect of another transmission request on the overall throughput in a wireless network, the another transmission request already in the queue. The method may additionally include positioning the transmission request before the another transmission request within the ready to transmit queue based on projecting an increased overall throughput of packets within the wireless network for the transmission request as compared to the another transmission request in view of the comparison.

In an example implementation, the identifying another transmission request as next to transmit in the queue is based on a reordering window, wherein the reordering window represents a span of time within which transmission requests may be positioned within the ready to transmit queue.

Figure 2:
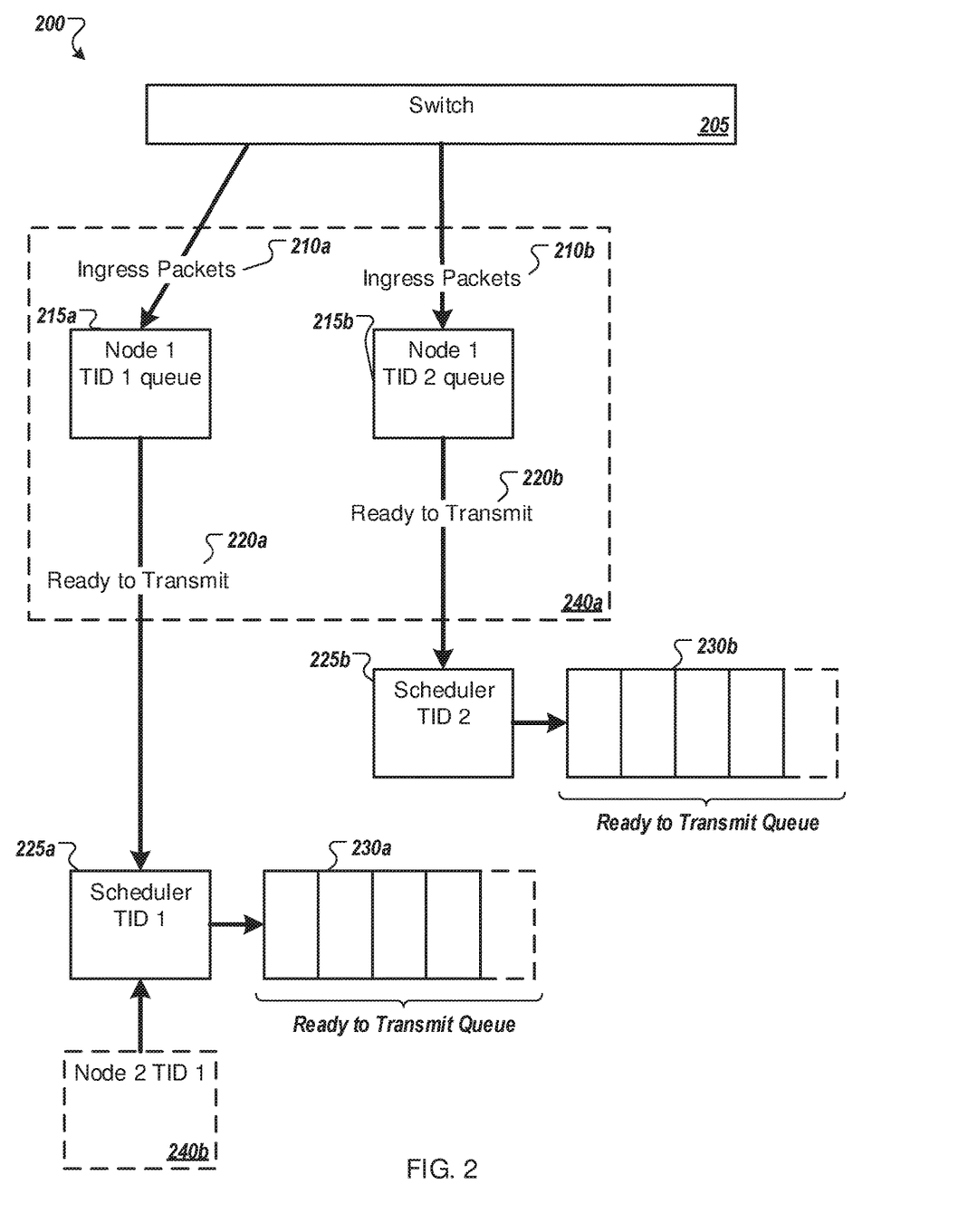
FIG. 2 illustrates an example schematic representation of a system implementing an out of order scheduler.

FIG. 2 illustrates an example schematic representation of a system 200 implementing an out of order scheduler (such as the schedulers 225a and 225b), in accordance with one or more embodiments of the present disclosure.

As illustrated in FIG. 2, the system 200 may include a switch 205 that is configured to transmit packets to one or more nodes. As ingress packets 210 arrive at the switch 205, the ingress packets 210 are identified as being routed to Node 1, Node 2, etc., and to which TID they belong. For example, the dashed box 240a indicates the processing and sorting of the ingress packets destined for Node 1. The ingress packets 210a are associated with and processed for the TID 1 of Node 1 (referred to hereafter as T1N1) and placed in an associated queue 215a. As the Node 1 TID 1 queue 215a accumulates a certain number of packets or a certain amount of time elapses, the particular TID (e.g., T1N1) may be identified as being ready to transmit. For example a ready to transmit message 220a may be sent regarding T1N1 to a scheduler 225a for TID 1. Additionally or alternatively, a setting or flag may be set that the T1N1 is ready to transmit, which may be checked by the scheduler 225a of TID 1. In some embodiments, the Node 1 TID 1 queue 215a may continue to aggregate packets even after the indication that T1N1 is ready to transmit. In some embodiments, the aggregation of additional packets may trigger an additional ready to transmit message 220a. In some embodiments, the system 200 may be configured to transmit to multiple nodes at a single time, and the ready to transmit message 220a may wait for and/or be based on both T1N1 and T1N2 being ready to transmit (e.g., having both accumulated enough packets and/or both had enough time elapse).

The scheduler 225a of TID 1 may operate to place and/or select TIDs within a ready to transmit queue 230a associated with the set of TID is for the various nodes. For example, the scheduler 225a may operate based on obtaining notification that T1N1 is ready to transmit and that TID 1 of Node 2 (referred to hereafter as T1N2) is ready to transmit. The dashed box 240b may indicate the processing and sorting of ingress packets destined for Node 2, and may operate in a similar or comparable manner to the dashed box 240a. The scheduler 225a may obtain notification that T1N1 and/or T1N2 are ready to transmit via a ready to transmit message, checked flag or setting, etc.

In some embodiments, the scheduler 225a may consider metrics of the one or more TIDs associated with the ready to transmit queue 230a in deciding the order of scheduling transmission. For example, the scheduler 225a may observe the metrics of a variety of TIDs already within the ready to transmit queue 230a, and may use that information to select where within the ready to transmit queue 230a a newly identified ready to transmit TID is to be positioned. An example of such an approach is described with greater detail in FIGS. 3A and 6. In these and other embodiments, the scheduler 225a may then select the TID at the head of the ready to transmit queue 230a as the TIDs have already been positioned within the ready to transmit queue 230a in an efficiency-improving manner.

Another example of how the scheduler 225a may consider metrics of the one or more TIDs associated with the ready to transmit queue 230a in deciding the order of scheduling transmission may include selecting which TID is to be transmitted when the time for transmission has arrived. For example, the scheduler 225a may place TIDs at the end of the ready to transmit queue 230a when notification is obtained that a TID is ready for transmission such that the TIDs are ordered chronologically within the ready to transmit queue. When the wireless medium is available (e.g., some sort of carrier sense is utilized to check the wireless medium, contention has been won for the wireless medium, a TX_DONE event is observed, etc.), the scheduler 225a may determine metrics for the TIDs within the ready to transmit queue 230a. Based on those metrics, the scheduler 225a may select the TID with the best metrics or the metrics indicating a projection of the highest throughput to increase the overall efficiency of the wireless network. An example of such an approach is described with greater detail in FIGS. 3B and 7.

While the scheduler 225a associated with TID 1 is illustrated as receiving input from Nodes 1 and 2, it will be appreciated that any number of nodes may be serviced by the switch 205, each of which may or may not include associated packets in TID 1 that are being aggregated and waiting to be transmitted. Thus, while Nodes 1 and 2 are used to illustrate the example, any number of nodes and associated TIDs are contemplated.

Additionally, while a discussion has been provided for the placement in and selection from the ready to transmit queue 230a by the scheduler 225a for TID 1, a corresponding scheduler 225b and ready to transmit queue 230b may also operate for TID 2, including the corresponding processing of incoming packets 210b to be aggregated in a Node 1 TID 2 queue 215b and a ready to transmit message 220b being sent to the scheduler 225b for TID 2. As described above, the scheduler 225b may operate on TID 2 from any number of nodes. In some embodiments, multiple schedulers may operate in parallel, each with a corresponding category of TID and each servicing multiple nodes.

Additionally, the teachings are applicable to any type of wireless communication system. For example, while nodes and switches are described for one context of wireless communication, the teachings of the out of order scheduling are also applicable to other wireless communication such as Bluetooth®, Bluetooth Low Energy, Zigbee®, Thread, mmWave, etc.

Modifications, additions, or omissions may be made to the system 200 without departing from the scope of the present disclosure. For example, the designations of different elements in the manner described is meant to help explain concepts described herein and is not limiting. Further, the system 200 may include any number of other elements or may be implemented within other systems or contexts than those described. For example, any number of schedulers, nodes, TIDs, and/or ready to transmit queues with corresponding flows may be included.

Figure 3A:
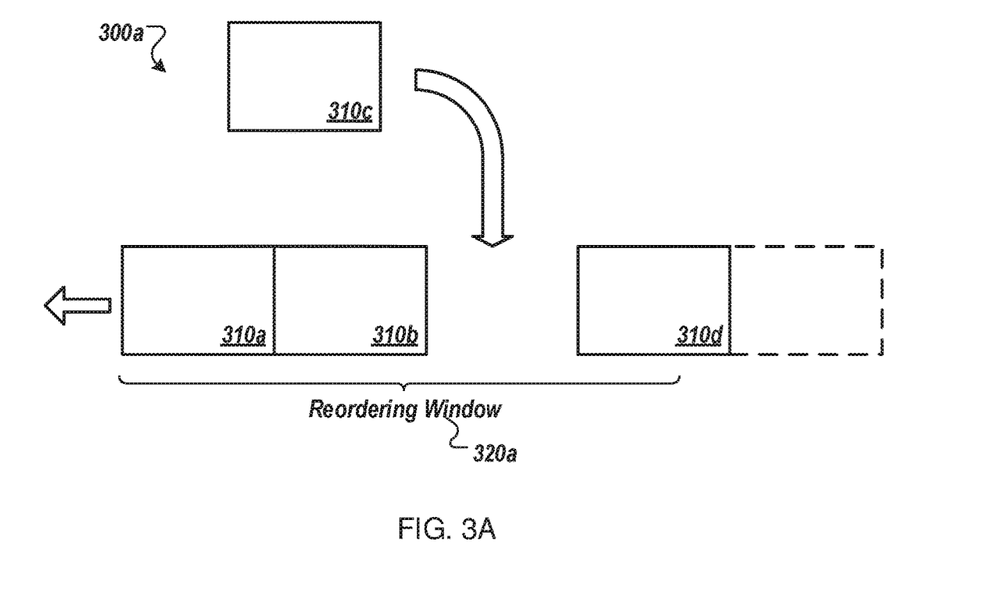
FIGS. 3A and 3B illustrate examples of adding TIDs to or selecting TIDs from a ready to transmit queue.
Figure 3B:
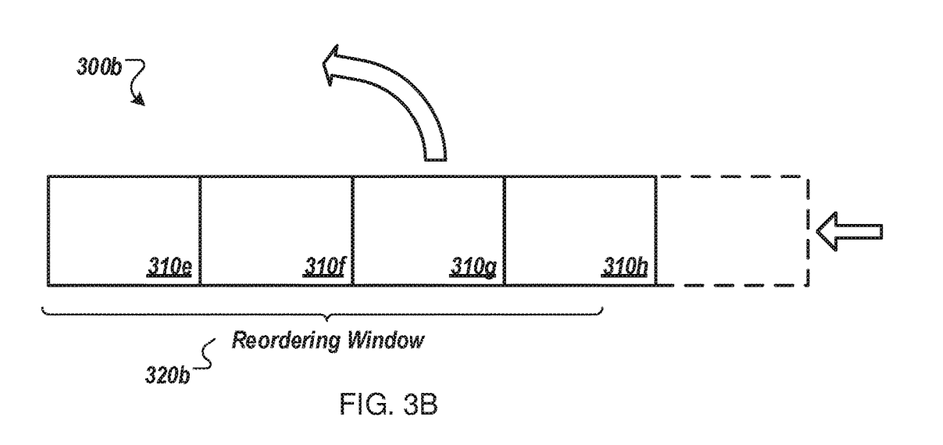

FIGS. 3A and 3B illustrate examples of adding TIDs 310 to, or selecting TIDs 310 from a ready to transmit queue 300, respectively, in accordance with one or more embodiments of the present disclosure. In FIG. 3A, a TID 310c that is ready to transmit may be added to the ready to transmit queue 300a in an out of order manner. In FIG. 3B, a TID 310g may be selected from the ready to transmit queue 300b in an out of order manner. For example, in both of the examples of FIGS. 3A and 3B, the order of selection of the TIDs 310 is not necessarily the order in which they were identified as being ready for transmission.

As illustrated in FIG. 3A, the TID 310c may be placed in the ready to transmit queue 300a based on a comparison of the associated transmission of the TID 310c's metrics with those of the other TIDs 310 already within the ready to transmit queue 300a (such as the TIDs 310a, 310b, and 310d). For example, for a given TID 310 in the ready to transmit queue 300a, the PHY rate for the given node, a number of transmission bytes that have been aggregated for transmission to the given node, and/or a protocol overhead used when transmitting to the given node may be combined to determine the overall data throughput associated with the given TID 310 if it were selected for transmission. Those metrics may be generated for each of the TIDs within the ready to transmit queue (e.g., for the TIDs 310a, 310b, and 310d) as well as for a newly identified as ready to transmit TID (e.g., the TID 310c). Based on the comparative metrics of the TIDs 310, the new TID 310c may be slotted within the ready to transmit queue 300a such that the overall efficiency of the network is improved. For example, if the metrics projected that the TIDs 310a and 310b would provide higher throughput than the TID 310c, but the TID 310c would provide higher throughput than the TID 310d, the TID 310c may be placed in the ready to transmit queue 300a between the TID 310b and 310d.

In these and other embodiments, when the wireless medium is ready for transmission, the TID 310 at the head of the ready to transmit queue 300a may be selected, as the order of TIDs 310 in the ready to transmit queue 300a has been selected in light of the metrics of the TIDs 310.

In some embodiments, a reordering window 320a may be used when deciding where in the ready to transmit queue 300a the new TID 310c is to be placed. For example, whenever a TID 310 is identified as being ready for transmission, that TID 310 may be given a timestamp indicating the time it was ready for transmission. The reordering window 320a may serve as a limit of how far rearranged the ready to transmit queue 300a may become. For example, when the scheduler is deciding where within the ready to transmit queue 300a to place the new TID 310c, the timestamp of the TID 310c may be compared to the timestamps of the other TIDs 310 within the ready to transmit queue 300a. If the timestamp of the new TID 310c is within the reordering window 320a of another TID 310 within the ready to transmit queue 300a, that TID 310 may be eligible for consideration of whether or not the new TID 310c is to be rearranged relative to that TID 310; if the timestamp of the new TID 310c is farther away from a given TID 310 than the reordering window 320a, then the given TID 310 may remain where it is in the ready to transmit queue 300a and the new TID 310c may not be compared to the given TID 310. In some embodiments, the reordering window 320a may operate as a +/− of time surrounding the timestamp of the new TID 310c.

In some embodiments, the reordering window 320a may be variable. For example, the size of the reordering window 320a may be a setting that is configurable by a network administrator, or otherwise selectable. In some embodiments, the size of the reordering window 320a may be automatically adjusted. For example, if the metrics of the TIDs 310 for determining where in the ready to transmit queue 300a are close to each other, the reordering window 320a may be smaller, and if the metrics of the TIDs 310 are highly varied, the reordering window 320a may be larger. For example, if the metrics project that the TID 310d provides one throughput, and the TID 310c is a 2% increase and the TID 310b is a 3% increase, the TIDs 310b and 310c may be positioned ahead of TID 310d, even though the TIDs 310b and 310c represent only a small gain in overall throughput. By reducing the size of the reordering window in such an example, the TID 310c may be positioned after the TID 310d because of the small gain in overall throughput, rather than before, even though the TID 310c may represent at least some gain. In some embodiments, the size of the reordering window 320a may be proportionate to the relative difference between the metrics of the TIDs 310. As the disparity between the metrics increases, the size of the reordering window 320a may also increase. In some embodiments, the size of the reordering window 320a may be adjusted after determining the metrics of the TIDs 310 that fell within an initial window, and the TIDS 310 within the new size of the reordering window 320a are those against which the new TID 310c are compared when determining where in the ready to transmit queue 300a the new TID 310c is to be slotted. In some embodiments, the adjustment may be based on PHY rate.

As illustrated in FIG. 3B, when selecting a TID 310 from the ready to transmit queue 300b, the selection of the TID 310 for transmission may be selected based on one or more metrics. In these and other embodiments, when a new TID 310 is identified as being ready for transmission, the new TID 310 may be placed at the end of the ready to transmit queue 300b (e.g., may be added chronologically). When the wireless medium is available for transmission (e.g., a TX_DONE event is observed), the scheduler may select a TID 310 from within the ready to transmit queue 300b. Rather than selecting the TID 310 at the head of the ready to transmit queue 300a as illustrated in FIG. 3A, the scheduler may select any TID 310 within the ready to transmit queue 300b (or a subset of the TIDs 310 within the ready to transmit queue 300b).

In determining which TID 310 to select, the scheduler may determine one or more metrics for the TIDs 310 within the ready to transmit queue 300b. For example, for a given TID within the ready to transmit queue 300b, the PHY rate for the given node, a number of transmission bytes that have been aggregated for transmission to the given node, and/or a protocol overhead used when transmitting to the given node may be combined to determine the overall data throughput associated with the given TID 310 if it were selected for transmission. Based on these metrics (or any other metrics), the scheduler may select the TID 310 for transmission with the highest or most favorable metrics. For example, if the TID 310e would be projected to have a first throughput per unit time, the TID 310f had 10% more throughput, the TID 310g had 12% more throughput, and the TID 310h had 8% more throughput, the scheduler may select the TID 310g for transmission based on the TID 310g having the most favorable metrics.

In some embodiments, a reordering window 320b may be used when deciding which TID 310 to select for transmission. For example, the scheduler may limit how far back into the ready to transmit queue 300b the scheduler may consider TIDs 310 based on the reordering window 320b. If a given TID is within the reordering window 320b, the given TID may be considered for potential transmission. If the TID is outside of the reordering window 320b, the TID may not have its metrics determined and may not be considered for transmission. In some embodiments, the reordering window 320b may be a certain time length looking back from the TID 310e at the head of the ready to transmit queue 300b. For example, each TID 310 may receive a timestamp when being placed within the ready to transmit queue 300b. The scheduler may exclude from consideration TIDs with a timestamp that fall outside of the timestamp of the TID 310e plus the reordering window 320b. In some embodiments, the reordering window may be on an order of milliseconds (e.g., 10 ms, 20 ms, 30 ms, 50 ms, etc.).

In some embodiments, the reordering window 320b may be variable. For example, the size of the reordering window 320b may be a setting that is configurable by a network administrator, or otherwise selectable. In some embodiments, the size of the reordering window 320b may be automatically adjusted. For example, if the metrics of the TIDs 310 for consideration for transmission are close to each other, the reordering window 320b may be smaller, and if the metrics of the TIDs 310 are highly varied, the reordering window 320b may be larger. For example, if the metrics project that the TID 310e provides one throughput, and the TID 310f is a 2% increase and the TID 310g is a 3% increase, the TID 310g may be selected for transmission ahead of two other TIDs, even though the TID 310g represents only a small gain in overall throughput. By reducing the size of the reordering window 320b in such an example, the TID 310g may not be selected for transmission before the TID 310e and 310f because of the small gain in overall throughput, even though the TID 310g may represent at least some gain, because the decrease in size of the reordering window 320b shifts the TID 310g outside of the reordering window 320b. In some embodiments, the size of the reordering window 320b may be proportionate to the relative difference between the metrics of the TIDs 310. As the disparity between the metrics increases, the size of the reordering window 320b may also increase. In some embodiments, the size of the reordering window 320b may be adjusted after determining the metrics of the TIDs 310 that fell within an initial window, and the TIDS 310 within the new size of the reordering window 320b are those considered as eligible for transmission. In some embodiments, the adjustment may be based on PHY rate.

Modifications, additions, or omissions may be made to FIGS. 3A and 3B without departing from the scope of the present disclosure. For example, the designations of different elements in the manner described is meant to help explain concepts described herein and is not limiting. Further, the use of the ready to transmit queues 300 may include any number of other elements or may be implemented within other systems or contexts than those described. For example, any number TIDs from any number of nodes may be included in the ready to transmit queues 300.

Figure 4A:
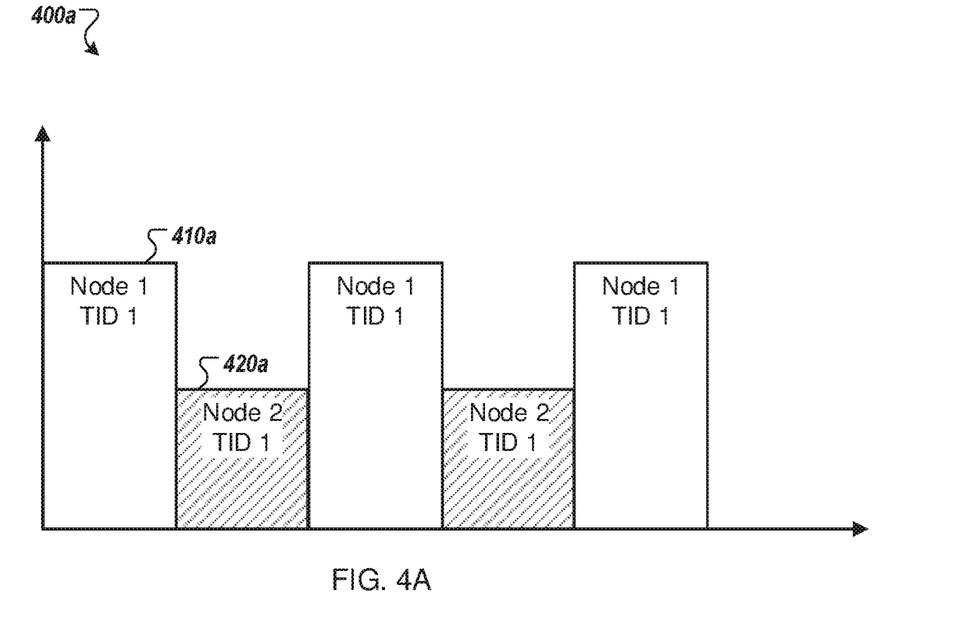
FIGS. 4A and 4B illustrate example plots of quantities of packets transmitted according to various scheduling techniques.
Figure 4B:
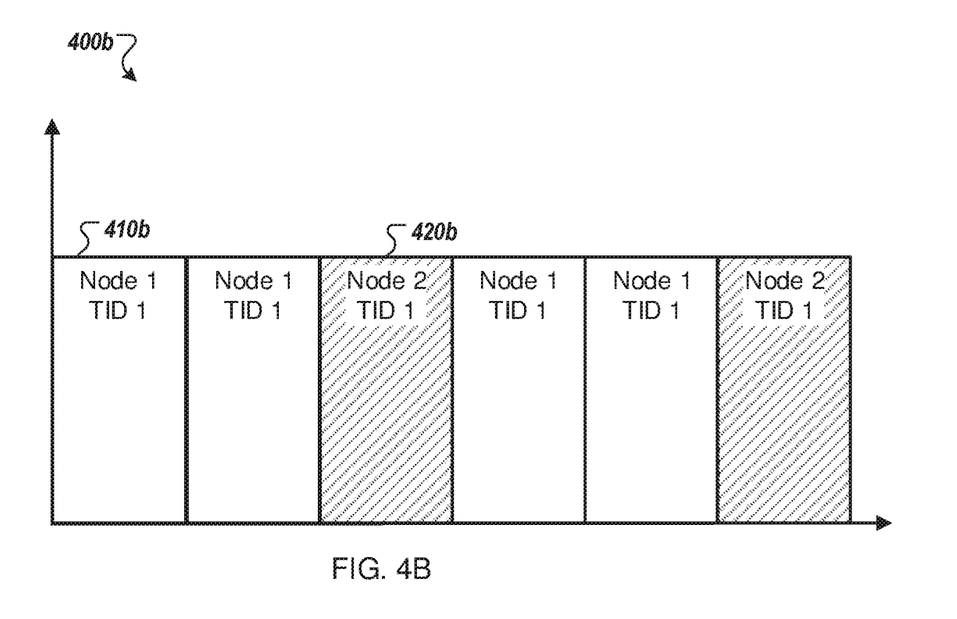

FIGS. 4A and 4B illustrate example plots 400a and 400b of quantities of packets transmitted according to various scheduling techniques, in accordance with one or more embodiments of the present disclosure. For convenience, the plots 400a and 400b illustrate scheduling associated with one TID and two nodes, namely, Node 1 TID 1 (N1T1) 410 and Node 2 TID 1 (N2T1) 420. FIG. 4A illustrates a round-robin scheduling where the scheduler alternates between or among nodes with TIDs that are ready for transmission. FIG. 4B illustrates the use of an out of order scheduler such that nodes may be selected in a different order than a strict alternating or strictly the order in which the TIDs were ready for transmission. The plots 400a and 400b illustrate time along the x-axis and Aggregated MAC Protocol Data Unit (AMPDU) size along the y-axis.

As illustrated in FIG. 4A, N1T1 410a has a certain volume of AMPDU that is transmitted each time that N1T1 410a is selected for transmission. When N2T1 420a is selected for transmission, fewer packets have aggregated and thus fewer packets are transmitted when N2T1 420a is selected as compared to when N1T1 410a is selected for transmission. Because of the difference in size of AMPDU, the overall throughput for the wireless network is decreased because when N2T1 420a is selected for transmission, an inefficient use of the wireless medium occurs.

As illustrated in FIG. 4B, using an out of order scheduler to select TIDs for transmission, the overall throughput of the wireless network may be improved. For example, by selecting N1T1 410b for transmission twice before selecting N2T1 420b for transmission, N2T1 420b may aggregate additional packets while waiting to transmit, leading to more packets being sent when N2T1 420b is selected for transmission and an overall increase in throughput for the network overall. The selection of N1T1 410b more than once before N2T1 420b is selected for transmission may be accomplished using any approach consistent with the present disclosure.

In some embodiments, the use of an out of order scheduler may result in the repeated denial of opportunity of a particular TID to communicate within the wireless network. For example, if N1T1 410*b* was consistently more efficient when transmitting packets, it is possible that N2T1 420*b* may never be selected for transmission. To offset that risk, certain steps may be taken to avoid the starvation of N2T1 420*b*, or otherwise avoid a situation in which N2T1 420*b* is not given an adequate or desirable opportunity for transmission. In some embodiments, a counter may be used to track how often a particular TID has been transmitted, and may be used to permit all TIDs at least some access to the wireless media. For example, each time a TID is selected, the counter for that TID may be checked. Following the example illustrated in FIG. 4B, if the threshold is set at two, the N1T1 410*b* may be selected in the first two time slots, transmitted, and the counter may be incremented. When the third time slot comes up, the N1T1 410*b* may be selected again. However, because the counter is at the threshold, the scheduler may check the counter of other TIDs within the ready to transmit queue. If there are any counters that are at or below a bottom threshold (e.g., still zero), the scheduler may select those TIDs for transmission before selecting N1T1 410*b* for transmission again. Because N2T1 420*b* is still at zero (e.g., it has not been selected for transmission yet and so is at or below the bottom threshold), N2T1 420*b* may be selected for transmission and its counter incremented. At the fourth time slot, N1T1 410*b* may be selected by the scheduler as the most efficient for transmission (or may be at the head of the ready to transmit queue based on where it is slotted within the queue). Because the counter of N1T1 410*b* is at the threshold, the scheduler may check for other TIDs with counters still at or below the threshold. Because all other TIDs have a counter above the threshold, the scheduler may reset all counters and select the most efficient TID for transmission (e.g., may select N1T1 410*b* for transmission and resetting all counters for all TIDs to zero).

Modifications, additions, or omissions may be made to the plots 400*a*/400*b* without departing from the scope of the present disclosure. For example, the designations of different elements in the manner described is meant to help explain concepts described herein and is not limiting.

Figure 5:
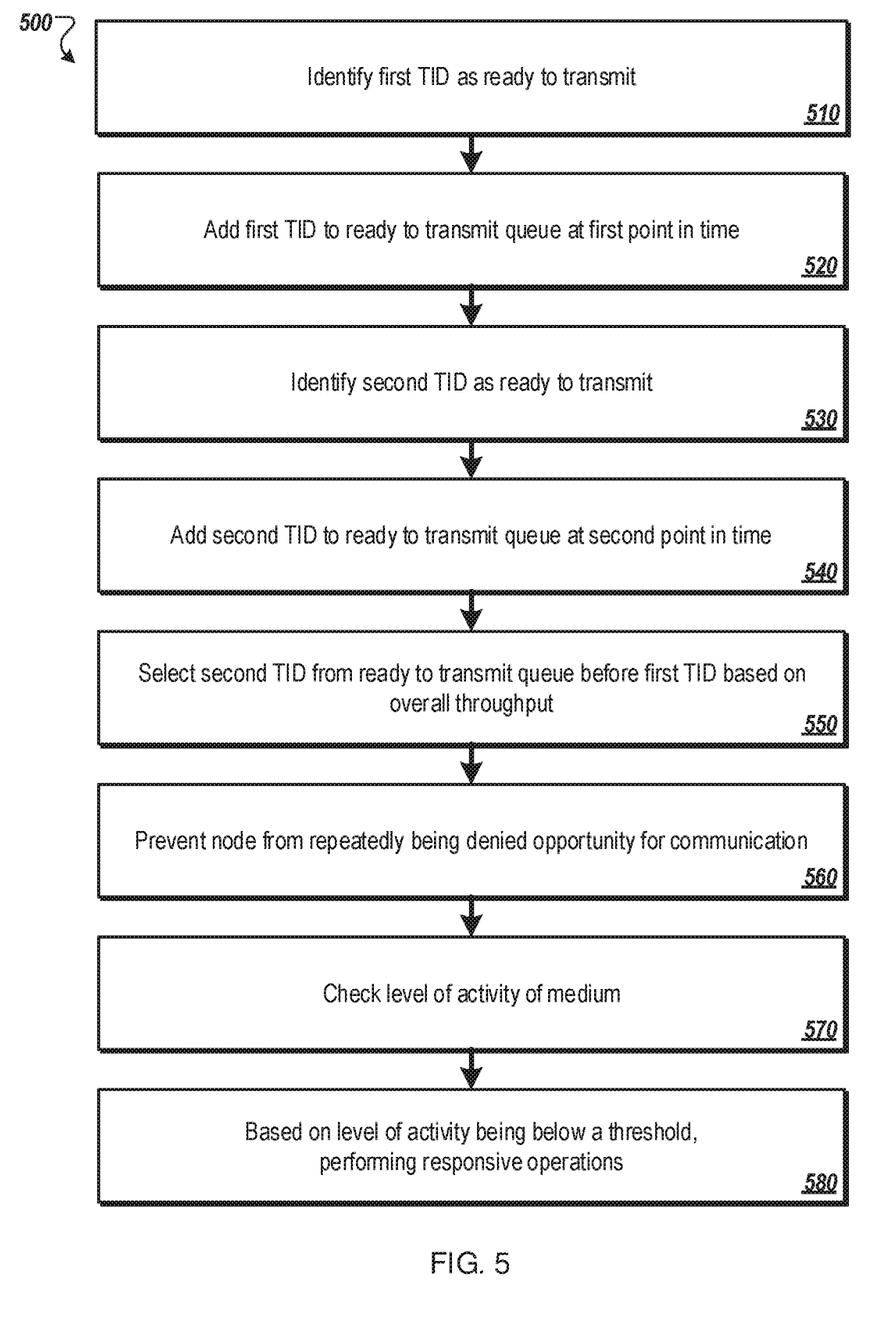
FIG. 5 illustrates a flowchart of an example method of out of order scheduling of TIDs.

FIG. 5 illustrates a flowchart of an example method 500 of out of order scheduling of TIDs, in accordance with one or more embodiments of the present disclosure. The method 500 may be implemented, in whole or in part, by one or more of the AP 110 of FIG. 1; the switch 205 of FIG. 2, or any combinations thereof.

At block 510, a first TID may be identified as being ready to transmit. For example, the first TID may belong to a set of TIDs and may be associated with a given node. After a certain quantity of packets have been accumulated or a certain amount of time has elapsed for the first TID, a ready to transmit message may be sent regarding the first TID, a flag may be set, or some indication may otherwise be provided that the first TID is ready for transmission.

At block 520, the first TID may be added to a ready to transmit queue. For example, the first TID may be added in a chronological manner to the ready to transmit queue (e.g., added to the end of the queue). As another example, the first TID may be positioned within the ready to transmit queue in a manner to improve efficiency (e.g., based on relative metrics of the first TID compared to other TIDs already within the ready to transmit queue).

At block 530, a second TID may be identified as being ready to transmit. For example, the second TID may belong to the same set of TIDs as the first TID, and may be associated with a different node. After a certain quantity of packets have been accumulated or a certain amount of time has elapsed for the second TID, a ready to transmit message may be sent regarding the second TID, a flag may be set, or some indication may otherwise be provided that the second TID is ready for transmission.

At block 540, the second TID may be added to the ready to transmit queue at a second point in time that is after the first point in time. For example, the second TID may be added in a chronological manner to the ready to transmit queue (e.g., added to the end of the queue). As another example, the second TID may be positioned within the ready to transmit queue in a manner to improve efficiency (e.g., based on relative metrics of the second TID compared to other TIDs already within the ready to transmit queue).

At block 550, the second TID may be selected from within the ready to transmit queue for transmission before the first TID based on overall throughput in the wireless network. For example, when the network medium is available and transmission is ready to occur, the second TID may be selected such that communication with the node associated with the second TID may be selected for transmission before the node associated with the first TID based on the metrics of the second TID indicating that the second TID has a higher throughput than the first TID. In some embodiments, the operation of selecting the second TID may be based on the second TID being placed in the ready to transmit queue earlier in the ready to transmit queue than the first TID at the block 540, an example of which is described with reference to FIGS. 3A and 6. In some embodiments, the operation of selecting the second TID may be based on selecting the second TID for transmission even though the second TID is not at the front of the ready to transmit queue (e.g., may have been placed further back in the ready to transmit queue than the first TID at the block 540), an example of which is described with reference to FIGS. 3B and 7.

At block 560, prevention of starvation of nodes may be undertaken. For example, a scheduler may take action to permit all TIDs to be selected from the ready to transmit queue at least once before a particular TID is selected from the ready to transmit queue in excess of a threshold number of times. For example, the scheduler may use a counter that is incremented each time a TID is selected, and if a TID is at the threshold, other TIDs with a counter of zero are selected before the TID at the threshold is selected again.

At block 570, a level of activity of the medium is checked. For example, a size of backlog at a switch may be checked, a clear channel assessment may be performed, a number of times the switch has deferred transmission may be counted, or any other metric or analysis may be used to check the busyness of the medium.

At block 580, based on the level of activity being below a threshold, one or more responsive operations may be performed. For example, certain features of the present disclosure used to increase the overall throughput may be modified, disabled, or otherwise adjusted in situations in which there is a high availability of wireless media. For example, if there is dead air time in the wireless network, there is no need to force a particular node to wait to receive a transmission to increase overall throughput.

In some embodiments, the responsive operations may include adjusting the size of a reordering window. If there is free air time, it may be desirable to include a certain amount of efficiency increase but it may also be desirable to impose limits on how far the scheduler may go to revise a typical order of scheduling TIDs for transmission. As another example, the aggregation timeout (e.g., the time elapsed or quantity of packets aggregated before ready to transmit) may be decreased such that TIDs may be identified as ready to transmit more quickly. Such a modification may permit packets to be sent more quickly, which may facilitate small TCP window streams. As a further example, the use of multiple frame transmission during transmit opportunity (TXOP) may be disabled, or the limit on the duration of TXOP may be reduced, permitting other devices using the wireless media to transmit more quickly, which may decrease latency for upstream traffic and may increase throughput for small TCP window streams.

Figure 6:
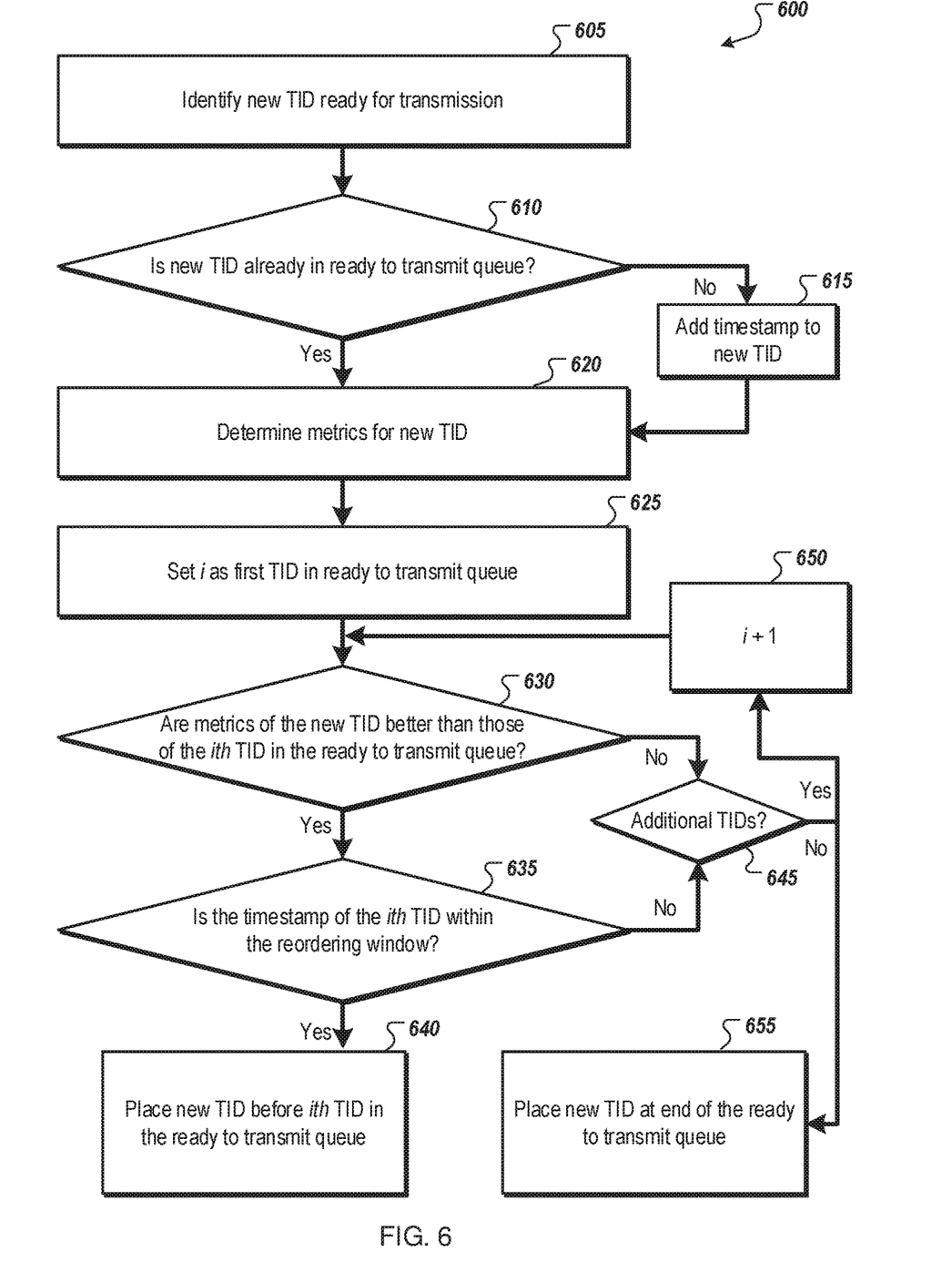
FIG. 6 illustrates a flowchart of an example method of out or order scheduling of TIDs by placing new TIDs at varied locations within a ready to transmit queue.

FIG. 6 illustrates a flowchart of an example method 600 of out or order scheduling of TIDs by placing new TIDs at varied locations within a ready to transmit queue, in accordance with one or more embodiments of the present disclosure. The method 600 may be implemented, in whole or in part, by one or more of the AP 110 of FIG. 1; the switch 205 of FIG. 2, or any combinations thereof.

At block 605, a new TID may be identified as being ready for transmission. For example, a certain quantity of packets may have accumulated for the new TID, or a certain amount of time may have elapsed with packets ready for transmission for the new TID. In these and other embodiments, the new TID may be identified as being ready for transmission based on a ready to transmit message being sent, a flag or other setting being set, or any other identification.

At block 610, a determination may be made whether the new TID is already in the ready to transmit queue. For example, the new TID may have been previously identified as ready to transmit and may have a parameter or metric change (e.g., the quantity of accumulated packets and/or PHY rate may change) to again trigger a notification that the TID is ready for transmit. If the new TID is not already in the ready to transmit queue, the method 600 may proceed to the block 615. If the new TID is already in the ready to transmit queue, the method 600 may proceed to the block 620.

At block 615, a timestamp may be added to the new TID. For TIDs which were already in the ready to transmit queue, they may maintain their earlier timestamp indicating how long the earlier TIDs have been in the ready to transmit queue. For the new TID, a timestamp may be added such that it may be known when the new TID was added to the ready to transmit queue.

At block 620, one or more metrics may be determined for the transmission associated with the new TID. For example, the PHY rate for the destination node of requested transmission associated with the new TID, a number of transmission bytes that have been aggregated for transmission to the destination node of requested transmission associated with the new TID, and/or a protocol overhead used when transmitting to the node of the new TID may be combined to determine the overall data throughput associated with the new TID. In these and other embodiments, the one or more metrics may correspond to a projection, forecast, estimation, extrapolation, prediction, etc. of the overall throughput within the wireless network associated with performing the transmission associated with the new TID.

At block 625, the first TID in the ready to transmit queue may be set as the increment variable i. The block 625 may initialize a comparison of the metrics of the new TID with the metrics of the other TIDs already in the ready to transmit queue.

At block 630, a determination may be made whether the metrics of the new TID are better than the metrics of the ith TID in the ready to transmit queue. If the metrics associated with the new TID are better, the method 600 may proceed to the block 635. If the metrics associated with the new TID are not better, the method 600 may proceed to the block 645. For example, if a combination of the PHY rate for the node associated with the new TID, a number of transmission bytes that have been aggregated for transmission to the node associated with the new TID, and/or a protocol overhead used when transmitting to the node associated with the new TID indicates a higher overall throughput in the wireless network as compared to the same metrics for the other TIDs in the ready to transmit queue, the method 600 may proceed to the block 635.

At block 635, a determination may be made whether the timestamp of the ith TID is within the reordering window. As described above, the reordering window may be based on the timestamp of the new TID and may represent a span of time based on when the new TID is ready for transmission. For example, if the timestamp of the ith TID is outside of the reordering window, the scheduler may omit that TID from consideration when determining where to place the new TID in the ready to transmit queue. If the timestamp of the ith TID is within the reordering window (e.g., the new TID and the ith TID are sufficiently close in time), the method 600 may proceed to the block 640. If the timestamp of the ith TID is outside of the reordering window (e.g., the new TID and the ith TID are too far apart in time), the method 600 may proceed to the block 645.

In some embodiments, the blocks 630 and 635 may be reversed such that the timestamps may be compared before comparing the metrics of the TIDs.

At block 640, based on the metrics of the new TID being better than the metrics of the ith TID and based on the timestamp of the ith TID being within the reordering window, the new TID may be placed in the ready to transmit queue before the ith TID. After the block 640, when the wireless network medium is available for transmission, the TID at the head of the ready to transmit queue may be selected for transmission to the node associated with the TID at the head of the ready to transmit queue. By doing so, the use of the wireless network medium may be improved because the ordering within the ready to transmit queue may be set in a manner to improve the overall throughput of the wireless network.

At block 645, based on either the metrics of the new TID being inferior to the metrics of the ith TID or the timestamp of the ith TID falling outside of the reordering window, a determination may be made whether there are additional TIDs in the ready to transmit queue against which the one or more metrics for the new TID have not been compared. If there are additional TIDs, the method 600 may proceed to the block 650. If there are no additional TIDs, the method 600 may proceed to the block 655.

At block 650, the counter i may be incremented by one such that the next TID in the ready to transmit queue may be used at the blocks 630 and 635 to compare the metrics and timestamps of the next TID to the new TID. The operations of 630, 635, 640, 645, and/or 650 may be repeated until all TIDs in the ready to transmit queue have been considered.

At block 655, based on no additional TIDs being in the ready to transmit queue, the new TID may be placed at the end of the ready to transmit queue.

Figure 7:
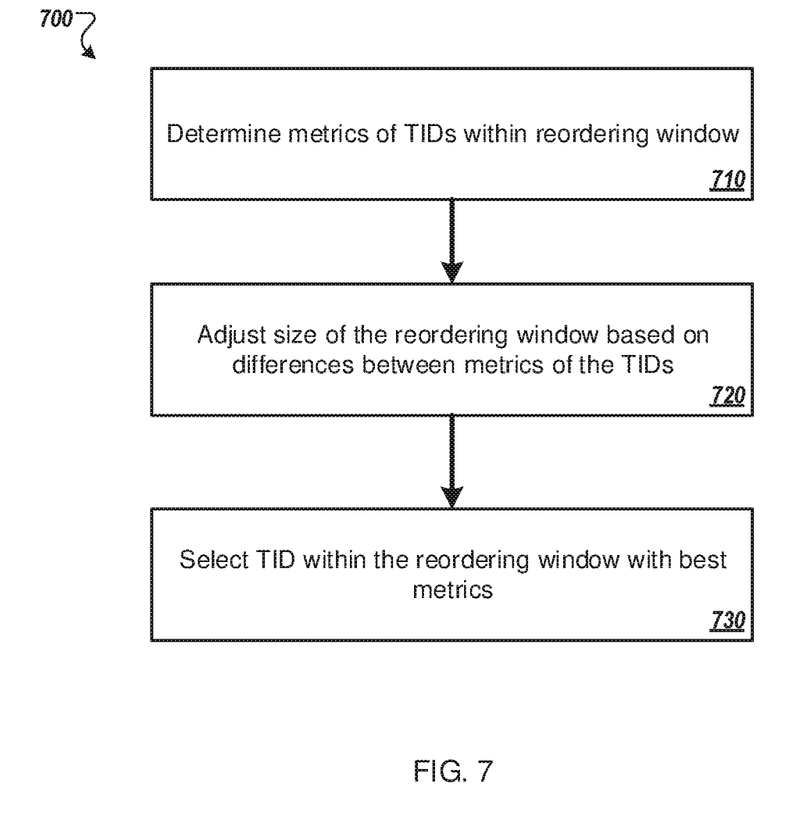
FIG. 7 illustrates a flowchart of an example method of out or order scheduling of TIDs by selecting TIDs for transmission from within a ready to transmit queue.

FIG. 7 illustrates a flowchart of an example method 700 of out or order scheduling of TIDs by selecting TIDs for transmission from within a reordering window, in accordance with one or more embodiments of the present disclosure. The method 700 may be implemented, in whole or in part, by one or more of the AP 110; the switch 205 of FIGS. 1 and 2, respectively, or any combinations thereof.

At block 710, one or more metrics of TIDs within the reordering window may be determined. For example, the PHY rate for the nodes of the TIDs, a number of transmission bytes that have been aggregated for transmission to the nodes of the TIDs, and/or a protocol overhead used when transmitting to the nodes of the TIDs may be combined for each of the TIDs to determine the overall data throughput associated with the respective TIDs.

At block 720, a size of the reordering window may be adjusted based on differences between metrics of the TIDs. For example, if the metrics are similar with small variations, the reordering window may be made adjusted to be small. As another example, if there is a wide disparity between metrics, the reordering window may be increased in size such that additional TIDs may be considered. If the size of the reordering window is increased, any new TIDs now falling within the reordering window may have their corresponding one or more metrics also determined. In some embodiments, the adjusting of the block 720 may be a relative change to a previous size of the reordering window. For example, if the variations in the metrics of the block 710 was lower than a previously checked variation among the metrics, the size of the reordering window may be decreased by a set amount (e.g., 10%) or by a corresponding amount that is based on the relative change in the variation in metrics (e.g., the variation decreased by 7% and so the reordering window is adjusted downward in size by 7%).

In some embodiments, an initial reordering window may be a set size (e.g., 20 ms), or may be based on the relative metrics of all or a subset of the TIDs within the ready to transmit queue (e.g., a variation from 0%-25% between the highest and lowest metrics corresponds to an initial reordering window of 10 ms, a variation from 25%-75% corresponds to an initial reordering window of 20 ms, and a variation from 75% and up corresponds to an initial reordering window of 30 ms).

At block 730, the TID within the reordering window with the best metrics may be selected from the ready to transmit queue. For example, the TID with the metrics indicating a maximum throughput may be selected from the ready to transmit queue. While the TID with the best metric is identified or described herein, it will be appreciated that any TID may be selected that is projected to improve the overall throughput, or that is comparatively better than metrics associated with another TID, without requiring the "best," a maximum, or completely optimized situation. Rather, even incremental improvements or gains are contemplated within the scope of the present disclosure.

One skilled in the art will appreciate that, for these and other processes and methods disclosed herein, the functions performed in the processes and methods may be implemented in differing order, simultaneously, etc. Furthermore, the outlined steps and operations are only provided as examples, and some of the steps and operations may be optional, combined into fewer steps and operations, or expanded into additional steps and operations without detracting from the essence of the disclosed implementations.

FIG. 8 illustrates a diagrammatic representation of a machine in the example form of a computing device 800 within which a set of instructions, for causing the machine to perform any one or more of the methods discussed herein, may be executed. The computing device 800 may include a mobile phone, a smart phone, a netbook computer, a rackmount server, a router computer, a server computer, a personal computer, a mainframe computer, a laptop computer, a tablet computer, a desktop computer, or any computing device with at least one processor, etc., within which a set of instructions, for causing the machine to perform any one or more of the methods discussed herein, may be executed. In alternative embodiments, the machine may be connected (e.g., networked) to other machines in a LAN, an intranet, an extranet, or the Internet. The machine may operate in the capacity of a server machine in client-server network environment. The machine may include a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" may also include any collection of machines that individually or jointly execute a set (or multiple sets) of instructions to perform any one or more of the methods discussed herein.

The example computing device 800 includes a processing device (e.g., a processor) 802, a main memory 804 (e.g., read-only memory (ROM), flash memory, dynamic random access memory (DRAM) such as synchronous DRAM (SDRAM)), a static memory 806 (e.g., flash memory, static random access memory (SRAM)) and a data storage device 816, which communicate with each other via a bus 808.

Processing device 802 represents one or more general-purpose processing devices such as a microprocessor, central processing unit, or the like. More particularly, the processing device 802 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 802 may also include one or more special-purpose processing devices such as an application specific integrated circuit (ASIC), a field programmable gate array (FPGA), a digital signal processor (DSP), network processor, or the like. The processing device 802 is configured to execute instructions 826 for performing the operations and steps discussed herein.

The computing device 800 may further include one or more network interface devices 822 which may communicate with one or more networks 818. The computing device 800 also may include a display device 810 (e.g., a liquid crystal display (LCD) or a cathode ray tube (CRT)), an alphanumeric input device 812 (e.g., a keyboard), a cursor control device 814 (e.g., a mouse) and a signal generation device 820 (e.g., a speaker). In at least one embodiment, the display device 810, the alphanumeric input device 812, and/or the cursor control device 814 may be combined into a single component or device (e.g., an LCD touch screen).

The data storage device 816 may include a computer-readable storage medium 824 on which is stored one or more sets of instructions 826 embodying any one or more of the methods or functions described herein. The instructions 826 may also reside, completely or at least partially, within the main memory 804 and/or within the processing device 802 during execution thereof by the computing device 800, the main memory 804 and the processing device 802 also constituting computer-readable media. The instructions may further be transmitted or received over a network 818 via the network interface device 822.

While the computer-readable storage medium 824 is shown in an example embodiment to be a single medium, the term "computer-readable storage medium" may include a single medium or multiple media (e.g., a centralized or distributed database and/or associated caches and servers) that store the one or more sets of instructions. The term "computer-readable storage medium" may also include any medium that is capable of storing, encoding or carrying a set of instructions for execution by the machine and that cause the machine to perform any one or more of the methods of the present disclosure. The term "computer-readable storage medium" may accordingly be taken to include, but not be limited to, solid-state memories, optical media and magnetic media.

Unless specifically stated otherwise, as apparent from the discussion, it is appreciated that throughout the description, discussions utilizing terms such as detecting, determining, analyzing, identifying, scanning or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium.

An example apparatus can be multiple-input multiple-output (MIMO) apparatus supporting as many as N×N discrete communication streams over N antennas. In an example the MIMO apparatus signal processing units can be implemented as N×N. In various embodiments, the value of N can be 4, 6, 8, 12, 16, etc. Extended MIMO operation enable the use of up to 2N antennae in communication with another similarly equipped wireless system. It should be noted that extended MIMO systems can communicate with other wireless systems even if the systems do not have the same number of antennae, but some of the antennae of one of the stations might not be utilized, reducing optimal performance.

Channel State Information (CSI) from any of the devices described in this disclosure can be extracted independent of changes related to channel state parameters and used for spatial diagnosis services of the network such as motion detection, proximity detection, and localization which can be utilized in, for example, WLAN diagnosis, home security, health care monitoring, smart home utility control, elder care, automotive tracking and monitoring, home or mobile entertainment, automotive infotainment, and the like.

Unless specific arrangements described herein are mutually exclusive with one another, the various implementations described herein can be combined to enhance system functionality and/or to produce complementary functions. Such combinations will be readily appreciated by those skilled in the art given the totality of the foregoing description. Likewise, aspects of the implementations may be implemented in standalone arrangements where more limited and thus specific component functionality is provided within each of the interconnected—and therefore interacting—system components albeit that, in sum, they together support, realize and produce the described real-world effect(s). Indeed, it will be understood that unless features in the particular implementations are expressly identified as incompatible with one another or the surrounding context implies that they are mutually exclusive and not readily combinable in a complementary and/or supportive sense, the totality of this disclosure contemplates and envisions that specific features of those complementary implementations can be selectively combined to provide one or more comprehensive, but slightly different, technical solutions. It will, therefore, be appreciated that the above description has been given by way of example only and that modification in detail may be made within the scope of the present disclosure.

The subject technology of the present disclosure is illustrated, for example, according to various aspects described below. Various examples of aspects of the subject technology are described as numbered examples (1, 2, 3, etc.) for convenience. These are provided as examples and do not limit the subject technology. It is noted that any of the dependent examples or portions thereof may be combined in any combination, and placed into an independent examples, e.g., Examples 1, 2, and 3. The other examples can be presented in a similar manner. The following is a non-limiting summary of some examples presented herein.

Example 1 includes a method including identifying a first transmit identifier (TID) associated with a first node of a wireless network as ready to transmit, and adding the first TID to a ready to transmit queue at a first point in time. The method also includes identifying a second TID associated with a second node of the wireless network as ready to transmit, and adding the second TID to the ready to transmit queue at a second point in time later than the first point in time. The method additionally includes selecting the second TID from the ready to transmit queue before selecting the first TID based on a projected increased overall throughput of packets within the wireless network when communicating with the second node before communicating with the first node.

Example 2 includes a wireless access point that includes one or more processors, and one or more non-transitory computer-readable media containing instructions which, when executed by the one or more processors, cause the wireless access point to perform one or more operations. The operations of Example 2 include obtain a first notification of a first transmit identifier (TID) associated with a first node of a wireless network as being ready to transmit, add the first TID to a ready to transmit queue at a first point in time, and obtain a second notification of a second TID associated with a second node of the wireless network as being ready to transmit. The operations of Example 2 also include add the second TID to the ready to transmit queue at a second point in time that is later than the first point in time, and select the second TID from the ready to transmit queue before selecting the first TID based on a projected increased overall throughput of packets within the wireless network when transmitting packets to the second node before transmitting packets to the first node.

Example 3 includes a non-transitory computer-readable media containing instructions which, when executed by one or more processors, cause a system to perform one or more operations that include identify a first transmit identifier (TID) associated with a first node of a wireless network as ready to transmit, add the first TID within a ready to transmit queue at a first point in time, and identify a second TID associated with a second node of the wireless network as ready to transmit. The operations also include add the second TID within the ready to transmit queue at a second point in time later than the first point in time, and select the second TID from the ready to transmit queue before selecting the first TID based on a projected increased overall throughput of packets within the wireless network when communicating with the second node before communicating with the first node.

With respect to the use of substantially any plural or singular terms herein, those having skill in the art can translate from the plural to the singular or from the singular to the plural as is appropriate to the context or application. The various singular/plural permutations may be expressly set forth herein for sake of clarity. A reference to an element in the singular is not intended to mean "one and only one" unless specifically stated, but rather "one or more." Moreover, nothing disclosed herein is intended to be dedicated to the public regardless of whether such disclosure is explicitly recited in the above description.

In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that include A alone, B alone, C alone, A and B together, A and C together, B and C together, or A, B, and C together, etc.). Also, a phrase presenting two or more alternative terms, whether in the description, claims, or drawings, should be understood to include one of the terms, either of the terms, or both terms. For example, the phrase "A or B" will be understood to include the possibilities of "A" or "B" or "A and B."

The present disclosure may be embodied in other specific forms without departing from its spirit or essential characteristics. The described implementations are to be considered in all respects only as illustrative and not restrictive. The scope of the present disclosure is, therefore, indicated by the appended claims rather than by the foregoing description. All changes which come within the meaning and range of equivalency of the claims are to be embraced within their scope.

What is claimed is:

1. A method, comprising:
   identifying first data that is ready for transmission;
   identifying second data that is ready for transmission, the first data and the second data being ready for transmission in a first order, the first data associated with a first device and the second data associated with a second device; and
   selecting one of the first data or the second data for transmission out of order from the first order, wherein the first data or the second data are selected for transmission out of order from the first order in view of a physical layer (PHY) rate of the first device or the second device.

2. The method of claim 1, wherein transmission of the first data and the second data being governed by a ready to send queue, the first order being provided at the queue.

3. The method of claim 2, wherein one of the first data or the second data is placed in the queue in the first order, the first order being indicative of a scheduled transmission.

4. The method of claim 2, wherein the first data is represented in the queue by a first identifier that is associated with the first data, wherein the second data is represented in the queue by a second identifier that is associated with the second data, wherein selecting one of the first data or the second data comprises selecting either the first identifier or the second identifier.

5. The method of claim 4, wherein selecting one of the first data or the second data comprises placing the first identifier or the second identifier in any queue position.

6. The method of claim 5, wherein the first identifier or the second identifier are placed in a queue position to increase an aggregated throughput.

7. The method of claim 6, the aggregated throughput being for at least one of the first device of the second device.

8. The method of claim 1, wherein the first data or the second data are selected for transmission out of order from the first order in view of a reordering window.

9. The method of claim 8 further comprising adjusting a size of the reordering window.

10. The method of claim 9, wherein the size of the reordering window is adjusted in view of at least one of: a physical layer (PHY) rate, a number of transmission bytes, or a protocol overhead.

11. The method of claim 1, wherein the first data or the second data are selected for transmission out of order from the first order in view of an efficiency metric.

12. A system, comprising:
   one or more processors; and
   one or more non-transitory computer-readable media containing instructions which, when executed by the one or more processors, cause the device to perform one or more operations comprising:
   identify first data that is ready for transmission;
   identify second data that is ready for transmission, the first data and the second data being ready for transmission in a first order, the first data associated with a first device and the second data associated with a second device; and
   select one of the first data or the second data for transmission out of order from the first order, wherein the first data or the second data are selected for transmission out of order from the first order in view of a physical layer (PHY) rate of the first device or the second device.

13. The system of claim 12, wherein transmission of the first data and the second data being governed by a ready to send queue, the first order being provided at the queue.

14. The system of claim 13, wherein one of the first data or the second data is placed in the queue in the first order, the first order being indicative of a scheduled transmission.

15. The system of claim 13, wherein the first data is represented in the queue by a first identifier that is associated with the first data, wherein the second data is represented in the queue by a second identifier that is associated with the second data, wherein selecting one of the first data or the second data comprises selecting either the first identifier or the second identifier.

16. The system of claim 15, wherein the first identifier or the second identifier are placed in a queue position to increase an aggregated throughput, the aggregated throughput being for at least one of the first device of the second device.

17. The system of claim 12, wherein the first data or the second data are selected for transmission out of order from the first order in view of a reordering window.

18. The system of claim 12, wherein the first data or the second data are selected for transmission out of order from the first order in view of an efficiency metric.

* * * * *